Patented May 13, 1930

1,758,472

UNITED STATES PATENT OFFICE

MORITZ SCHNETKA, OF LEVERKUSEN-ON-THE-RHINE, GERMANY, ASSIGNOR TO TITANIUM PIGMENT CO., INC., OF NEW YORK, N. Y.

PRODUCTION OF TITANIC OXIDE

No Drawing. Application filed June 25, 1928, Serial No. 288,296, and in Germany September 6, 1927.

The present invention concerns the hydrolytic precipitation of white titanic acid in the presence of a compound of the group comprising hydrofluoric acid and water soluble fluorides.

The principal difficulty in the manufacture of titanic acid or of white titanium pigments consists in obtaining on hydrolysis a pure white precipitate which persists even on ignition.

In accordance with the present invention white precipitation products, stable to ignition, are obtained by carrying out the hydrolysis from sulfuric acid solution in the presence of hydrofluoric acid or of soluble fluorides. In addition to the favourable influence exerted in regard to the stability of the white color of the precipitated titanic acid, the said hydrolytic precipitation is also considerably facilitated, with the result that the duration or temperature of the hydrolysis is reduced. Moreover, the titanic acid, precipitated by boiling at the ordinary pressure in the presence of hydrofluoric acid or fluorides can be filtered more easily than that obtained under similar conditions from a solution free from fluorides. The former appears in a more granular state, the latter in a slimy form.

The invention is illustrated by the following example; without limiting it thereto:

*Example.*—600 kgs. of worked up ilmenite, containing 8.6% $TiO_2$, 3.7% FeO and 22% total sulfuric acid, are dissolved in water, 13 kgs. of 45% hydrofluoric acid are added and heating is effected to boiling (under ordinary pressure). In order to prevent the concentration of free sulfuric acid, the quantity of which is increasing by hydrolysis, from becoming too high, 200 kgs. of water are added gradually during the hydrolysis. After boiling for 6 hours, 45.8 kgs.=89% of the titanic acid are separated. It is easily filtered and even after ignition at 900° C. remains pure white.

I claim:

1. In the process for the hydrolytic precipitation of white titanic acid from sulfuric acid solutions containing titanium sulfate and iron sulfate, the step which comprises carrying out the precipitation in the presence of a compound of the group consisting of hydrofluoric acid and water-soluble fluorides.

2. In the process for the hydrolytic precipitation of white titanic acid from sulfuric acid solutions containing titanium sulfate and iron sulfate, the step which comprises carrying out the precipitation in the presence of hydrofluoric acid.

In testimony whereof I have hereunto set my hand.

MORITZ SCHNETKA. [L. S.]